3,439,743
Patented Apr. 22, 1969

3,439,743
MISCIBLE FLOODING PROCESS
Malcolm R. J. Wyllie, Allison Park, Pa., assignor to Gulf Research & Development Company, Pittsburgh, Pa., a corporation of Delaware
No Drawing. Filed July 13, 1967, Ser. No. 653,024
Int. Cl. E21b 43/24, 43/20
U.S. Cl. 166—272      9 Claims

ABSTRACT OF THE DISCLOSURE

A miscible flooding process for the recovery of oil from underground formations in which a solvent for the oil is injected into the formation to miscibly displace oil through the formation to a production zone. Preferred solvents are hydrocarbons having from 2 to 6 carbon atoms per molecule. The solvent is followed by a mixture of inexpensive gas and either hot water or steam at a temperature which will vaporize the trailing edge of the injected solvent whereupon the solvent is miscibly displaced by the inexpensive gas. Thereafter, cold water is injected into the formation to move the previously injected fluids to the production zone.

---

This invention relates to a method for the recovery of oil from underground oil-bearing formations and more particularly to a method of increasing recovery of oil by injection of fluids at an injection well to displace oil through the oil-bearing formation to a production well.

One method that has been suggested for increasing the amount of oil recovered from underground oil-bearing formations is known as miscible flooding. In that method, a solvent for the oil is injected into the formation and displaced through the formation toward a production well spaced from the injection well. Because of the miscibility of the oil and the solvent, the solvent does not bypass the oil but replaces it in the formation. Miscible flooding is highly advantageous in stripping substantially all oil from that part of the formation through which the solvent flows.

It is essential to the success of the miscible displacement process that the solvent be recovered. The cost of the solvent may be several times the cost of the same volume of the oil. Recovery of the solvent is accomplished by following the solvent with water to displace the solvent through the formation to the production well. If the formation is to be stripped of solvent, the solvent must be miscible with water; hence, a solvent that is miscible with both oil and water is required in the usual miscible displacement process. The number of solvents which will meet the requirements of miscibility of oil and water is limited. Suitable solvents, frequently referred to as amphipathic solvents, are acetone and intermediate alcohols such as isopropyl alcohol and tertiary butyl alcohol. Those solvents are relatively expensive. Moreover, the miscibility of the solvent with water makes further processing of the mixture of solvent and water recovered at the production well necessary to recover the solvent.

This invention resides in the miscible flooding of a formation from an injection well to a production well with a volatile, water-immiscible solvent for the oil. The solvent is followed by an inexpensive gas such as air mixed with a quantity of hot water or steam that will supply heat adequate to vaporize solvent immediately ahead of the injected gas which miscibly displaces the vaporized solvent. The formation is water flooded following the injection of the mixture of gas and water or steam to move the injected hot water or steam through the formation and leave the inexpensive gas as the residual gas in the formation.

This invention can be used with any well arrangement that permits injection into the oil-bearing formation at one location and production from the formation at some position spaced from the point of injection. Conventional well-spacing patterns such as 5-spot and 9-spot patterns, for example, can be used with some of the wells serving as injection wells and others as production wells. The well pattern should be designed to provide an effective sweep of the formation, and the particular pattern used will depend upon the characteristics of the reservoir, the cost of drilling wells, and the usual other factors considered in selecting a well pattern. A single well arranged for separate injection and production zones as described in U.S. Patent No. 3,004,600 can be used.

The solvent injected to displace the oil should be miscible with oil, volatile to allow vaporization when the formation is heated, and should be immiscible with water. Suitable solvents are hydrocarbons having from 2 to 6 carbon atoms per molecule. The preferred solvents are hydrocarbon mixtures containing principally hydrocarbons having 3 or 5 carbon atoms per molecule with minor amounts of $C_2$ and $C_6$ hydrocarbons. The solvent is injected in an amount ranging from about 5 to 20 percent of the pore volume of the reservoir. As the solvent travels through the reservoir, the slug of solvent diminishes in size through admixture with the oil in the reservoir. The size of the slug of solvent injected into the reservoir should be large enough to have small amounts of relatively oil-free solvent produced at the production well.

As the solvent flows through the formation toward the production well, it mixes with oil contacted at the leading edge of the solvent slug to expand the oil phase and push a bank of oil ahead of the solvent toward the production well. Trailing the oil zone is a transition zone in which there is a mixture of oil and solvent, and that mixture is followed by a moving zone of relatively pure solvent. The mixture of solvent and oil has a greatly reduced viscosity as compared to the oil alone and flows readily through the formation. Small amounts of oil that may remain on the rock surfaces in the oil-bearing formation are stripped by the solvent to provide virtually complete removal of oil from that portion of the oil-bearing formation subjected to the flooding operation.

A mixture of an inexpensive gas, preferably air, and hot water or steam is injected into the formation behind the slug of solvent. Any inexpensive gas such as nitrogen, $CO_2$ or flue gas that can be obtained at low cost can be used. The amount of hot water or steam should be adequate to vaporize the solvent at the trailing edge of the solvent zone. The temperature to which the solvent must be heated will depend on the composition of the solvent and the pressure of the underground formation. When a hydrocarbon such as propane is used as the solvent, the formation at the trailing edge of the solvent bank must be heated to at least about 200° F. Higher formation temperatures are required for higher boiling point solvents. A temperature of 300° F. to 400° F. is preferred when the solvent is LPG. It is preferred that the inexpensive gas and the hot water or steam be injected into the formation at a temperature o f500° F. or higher. The gas and hot water or steam are injected into formation in an amount of each fluid ranging from about 5 to 20 percent of the pore volume of the reservoir. The amount of steam and hot water should be adequate to supply the heat required to vaporize the solvent throughout substantially all of that part of the formation flooded.

The hot water or steam heats the formation to a temperature high enough to vaporize the solvent in the trailing edge of the solvent bank. The inexpensive gas injected with the hot water or steam then miscibly displaces the solvent vapor to form a bank of vaporized solvent ahead of the gas. A bank of a mixture of the solvent vapor and gas follows the bank of relatively pure solvent and is followed by the inexpensive gas. By converting the solvent to the vapor state, substantially all of the solvent in the reservoir is replaced by the inexpensive gas and that gas is left as the gaseous phase in the formation.

The mixture of gas and hot water or steam is followed by the injection of cold water at the injection well. The term "cold" is used to distinguish the water from the hot water, not to indicate that cooling of the water is necessary. The cold water pushes the hot water ahead of it toward the production well and thereby moves the hot zone in which vaporization of solvent occurs outwardly toward the injection well. The leading edge of the injected cold water extracts heat from the formation and carries that heat outwardly toward the production well. The injected cold water displaces some of the gas ahead of it toward the production well until the gas concentration in the formation is reduced to residual gas concentration.

In a typical miscible displacement process using this invention to recover oil from a reservoir having a pay zone 20 feet thick at a temperature 100° F. having 10-acre well spacing, LPG consisting principally of propane is injected into a reservoir in an amount equal to 15 percent of the pore volume. The LPG is followed by the simultaneous injection of 318 barrels per day of steam at 1,000 p.s.i., 544° F., and 1,850,000 stud. cu. ft./da. of air at the same temperature and pressure as the steam. The injection of the steam and air is continued for 20 days to inject each of the fluids in an amount equal to 20 percent of the pore volume. The injection of steam and air is followed by the injection of cold water. Fluids are produced from production wells 467 feet from the injection well.

The method of this invention provides a miscible flooding process which permits recovery of virtually all of the oil in an oil-bearing formation in that portion of the formation swept by the injected fluids. By converting the solvent used for the miscible displacement of the oil to the gaseous phase, that solvent in turn is miscibly displaced from the formation by a low-cost gas. The use of hot water or steam to supply heat to the formation avoids any consumption of the solvent during the vaporization. Moreover, the volatile nature of the hydrocarbon solvents used in this invention does not interfere with the supplying of heat to the formation. In contrast, if an in-situ combustion process were employed to supply the necessary heat, the formation ahead of the combustion zone would be stripped of hydrocarbons and thereby would prevent maintenance of the combustion front.

I claim:

1. A method for the recovery of oil from an underground oil-bearing formation penetrated by an injection well and a production well spaced from the injection well comprising displacing down the injection well and from the injection well into the formation a volatile solvent liquid at the normal formation temperature in a volume in the range of 5 to 20 percent of the pore volume of the formation swept by the solvent, said solvent being miscible with the oil and substantially immiscible with water, thereafter simultaneously displacing down the injection well a hot aqueous fluid and an inexpensive gas, the amount and temperature of the hot aqueous fluid being adequate to vaporize solvent in the formation at the trailing edge of the bank of injected solvent as the ban of solvent moves through the formation to the production well, the volume of each of the hot aqueous fluid and inexpensive gas being in the range of 5 to 20 percent of the pore volume of the formation swept by the injected fluids whereby the inexpensive gas miscibly displaces the vaporized solvent toward the production well, producing fluids at the production well, and then displacing down the injection well and into the formation cold water to move the hot water in the formation toward the production well and leave inexpensive gas as residual gas in the formation.

2. A method as set forth in claim 1 in which the aqueous fluid is steam.

3. A method as set forth in claim 1 in which the aqueous fluid is hot water.

4. A method as set forth in claim 1 in which the hot aqueous fluid and inexpensive gas displaced down the injection well are at a temperature of at least 500° F.

5. A method as set forth in claim 1 in which the solvent comprises hydrocarbons having from 2 to 6 carbon atoms per molecule.

6. A method as set forth in claim 1 in which the solvent is composed principally of hydrocarbons having from 3 to 5 carbon atoms per molecule.

7. A method as set forth in claim 1 in which the inexpensive gas is air.

8. A method as set forth in claim 1 in which the solvent is principally propane and the quantity of hot aqueous fluid injected into the formation is adequate to raise the temperature of the formation at the trailing edge of the injected solvent to a temperature of at least 200° F.

9. A method for the recovery of oil from an underground oil-bearing formation penetrated by an injection well and a production well spaced from the injection well comprising displacing down the injection well and into the formation in an amount in the range of 5 to 20 percent of the pore volume for the formation hydrocarbons having 2 to 6 carbon atoms per molecule to miscibly displace oil toward the production well, following the injected hydrocarbons with the simultaneous displacement of air and steam at a temperature of at least 500° F. in an amount of each in the range of 5 to 20 percent of the pore volume of the formation to vaporize the injected hydrocarbons and miscibly displace the vaporized hydrocarbons toward the production well, and thereafter displacing cold water down the injection well and into the formation to displace hot water in the formation toward the production well, and producing fluids at the injection well.

References Cited

UNITED STATES PATENTS

| 2,584,606 | 2/1952 | Merriam et al. | 166—11 |
| 2,796,132 | 6/1957 | Bruce | 166—39 |
| 2,839,141 | 6/1958 | Walter | 166—40 X |
| 2,897,894 | 8/1959 | Draper et al. | 166—9 |
| 3,042,114 | 7/1962 | Willman | 166—11 |
| 3,093,191 | 6/1963 | Glass | 166—11 |
| 3,167,121 | 1/1965 | Sharp | 166—11 |
| 3,285,336 | 11/1966 | Gardner | 166—11 X |
| 3,360,044 | 12/1967 | Lange | 166—11 |

STEPHEN J. NOVOSAD, *Primary Examiner.*

U.S. Cl. X.R.

166—273